United States Patent [19]

Strolle et al.

[11] Patent Number: 4,683,490

[45] Date of Patent: Jul. 28, 1987

[54] VIDEO SIGNAL PROCESSING APPARATUS

[75] Inventors: Christopher H. Strolle, Glenside, Pa.; Terrence R. Smith, Westmont, N.J.; Brian M. Hadwen, East Hampstead, N.H.

[73] Assignee: RCA Corporation, Princeton, N.J.

[21] Appl. No.: 741,591

[22] Filed: Jun. 5, 1985

[51] Int. Cl.$^4$ .............................................. H04N 9/67
[52] U.S. Cl. .......................................... 358/30; 358/31
[58] Field of Search ........................... 358/30, 31, 21 R

[56] References Cited

U.S. PATENT DOCUMENTS

| | | | |
|---|---|---|---|
| 2,921,121 | 1/1960 | Grundmann et al. | 178/5.4 |
| 4,343,017 | 8/1982 | Wilkinson | 358/31 |
| 4,507,676 | 3/1985 | Dischert | 358/30 |
| 4,530,004 | 7/1985 | Achiha | 358/31 |
| 4,551,753 | 11/1985 | Nishizawa et al. | 358/140 |
| 4,597,007 | 6/1986 | Reitmeier | 358/31 |

FOREIGN PATENT DOCUMENTS 859081  1/1961  United Kingdom .

OTHER PUBLICATIONS

J. O. Drewery, "The Filtering of Luminance and Chrominance Signals to Avoid Cross—Colour in a PAL Colour System," BBC Engineering, Sep. 1976, pp. 8–39.

Primary Examiner—Michael A. Masinick
Attorney, Agent, or Firm—Paul J. Rasmussen; Eric P. Herrmann; David N. Caracappa

[57] ABSTRACT

The present application discloses a video signal processing apparatus for minimizing cross-color and cross-luminance interference in a composite video signal. A first filter is coupled to a color difference signal input terminal and generates a signal occupying a first region of a predetermined spatio-temporal frequency space. A second filter is coupled to a brightness signal input terminal and generates a signal occupying a second region of the predetermined spatio-temporal frequency space exclusive of the first region. An encoder forms a composite video signal from the filtered color difference and brightness signals such that they occupy mutually exclusive spatio-temporal frequency spaces. A television receiver for decoding the composite video signal is described which comprises the serial connection of a vertical-temporal filter and a horizontal filter. Filters are also disclosed for the first and second filters described above which are the serial connection of vertical-temporal filters and a horizontal filter. Specific vertical-temporal filter arrangements are also disclosed.

29 Claims, 28 Drawing Figures

NTSC HORIZONTAL SPECTRA

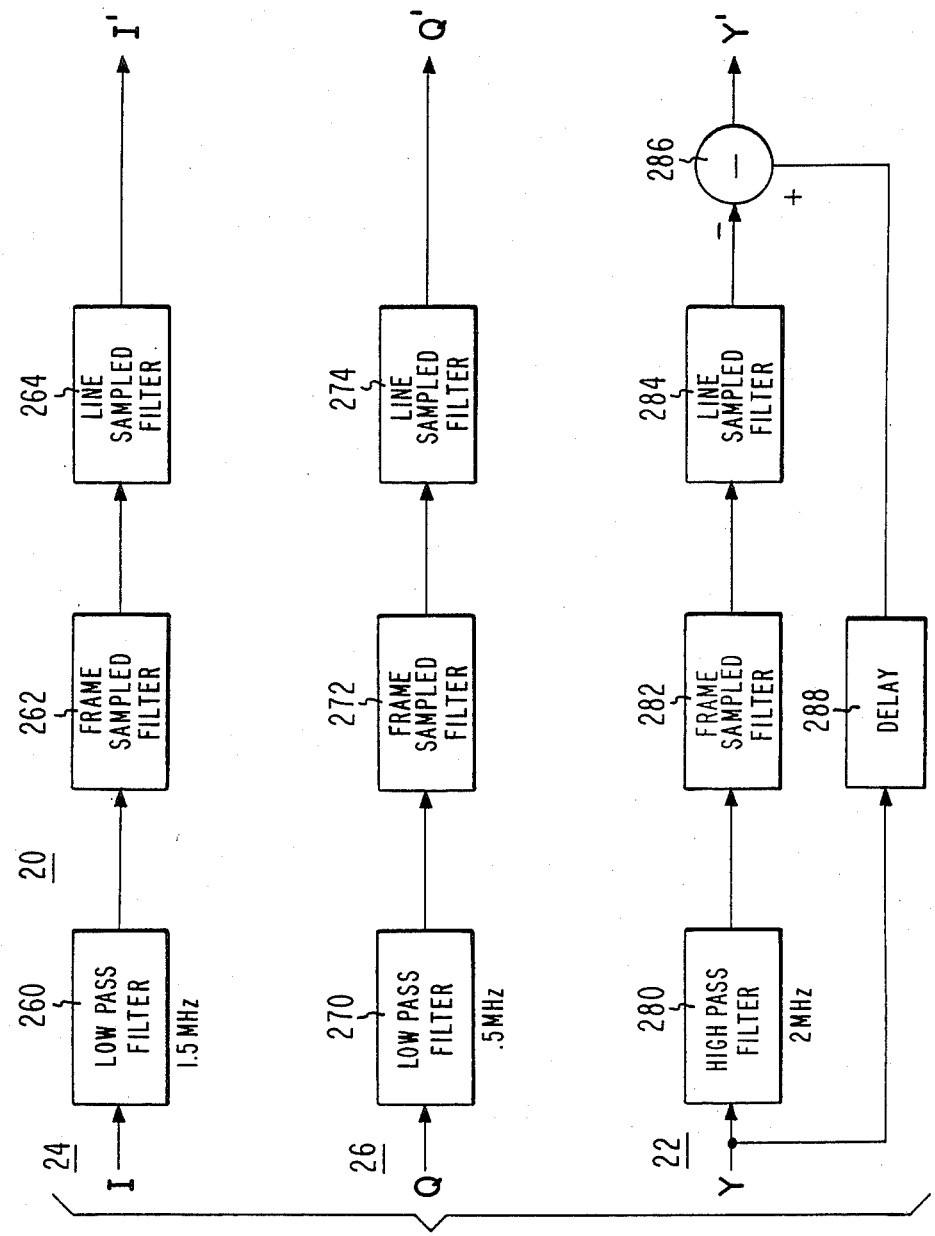

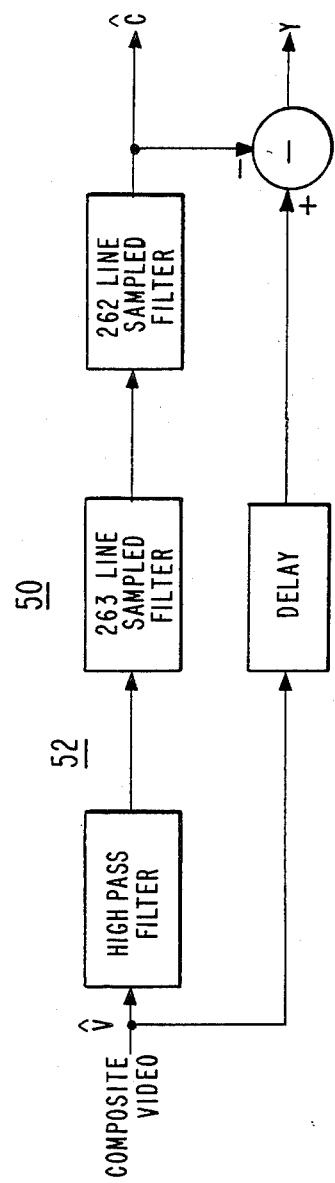

VIDEO SIGNAL PROCESSING APPARATUS

The present application relates to video signal processing apparatus for combining a brightness representative signal with a color difference signal in a manner which avoids cross-color and cross-luminance interference. In particular, filters are specified to process the relatively wideband brightness and relatively wideband color difference signals in such a manner that when combined neither will occupy the frequency space occupied by the other.

BACKGROUND OF THE INVENTION

When compatible color television broadcasting standards were generated, advantage was taken of the fact that the frequency space allocated to a black and white video signal is not completely occupied. Instead, because of the interlaced scanning structure of the signal, the brightness information, at baseband, tends to be clustered around multiples of the horizontal line frequency (15,750 Hz for NTSC black and white transmission), and the brightness information in the neighborhood of the multiples of the horizontal line frequency tends to be clustered in multiples of the frame repetition frequency (30 Hz for NTSC black and white transmission). The frequencies between these clusters have less energy. The color information, at baseband, is similarly clustered.

In developing standards for the compatible color television transmission, it was decided to place the clusters of color information between the clusters of brightness information. In the case of the NTSC signal in the United States, the color information was centered between the clusters of brightness information. In other words, the color information is clustered about odd multiples of one half the line rate.

In order to place the clusters of color information between the clusters of brightness information, the color information is modulated onto a subcarrier. The color information forms side bands clustered at frequencies separated by multiples of the line frequency from the subcarrier frequency. The subcarrier frequency was selected to be at an odd multiple (455th multiple for NTSC) of one-half the line rate. Thus, both the subcarrier and the sidebands containing the clusters of color information all are centered between the clusters of brightness information within the band of frequencies allocated to the composite television video signal.

When the composite television video signal is received at the receiver, the color information must be separated from the brightness information to properly display the image being transmitted. To recover luminance and chrominance components, comb filters are utilized to separate the signal components.

The comb filter in the color television receiver separates the signal into bands which should contain color information only and should contain brightness information only. But if these bands do not in fact contain only color information or only brightness information, the filter cannot accurately separate the color information from brightness information.

If the image changes in time, and/or has relatively high detail in the vertical or horizontal direction, the clusters of both brightness and color representative information occupy a larger frequency space than they do in the case of a still, relatively low detail picture. When the brightness signal of an image which is changing in time or has high detail is combined with the modulated color representative signal for such an image, it is possible and probable for a particular frequency to contain both color and luminance information.

In the article by J. O. Drewery "The Filtering of Luminance and Chrominance Signals to Avoid Crosscolour in a PAL Colour System" in BBC Engineering, September 1976, pages 8 to 39, a system is described in which color and brightness information are first combined and then filtered in such a way that the color information occupies a first predetermined frequency space and the brightness information occupies a second predetermined frequency space which does not include the frequency space occupied by the color information. In this way there can be no crosstalk between the color information and the brightness information. A complementary filter in the receiver separates the composite television video signal into a color chrominance component signal which contains no brightness information (i.e. no cross-luminance), and a luminance component which contains no color information (i.e. no cross-color).

The filtering scheme disclosed in this article, however, is a complementary filtering scheme. This means that, in a real system having non-perfect filters, the amount of crosstalk may rise to a $-12$ dB level at the points where the brightness channel filter response equals the color channel filter response. This is because the filter response characteristics are equal at the $-6$ dB point, and there are two filters, one at the transmitter and one at the receiver.

With one filter, the characteristics of the channels cannot be tailored to optimize the response of the system. For example, in the NTSC system, the bandwidth of the two color difference signals (I and Q) are different. In the filter circuit disclosed in the article, the response of the two channels must remain equal, even though the bandwidth of the two color difference signals are different.

It is an object of the present invention to provide video signal processing apparatus for combining a brightness representative signal and a color representative signal into a composite video signal in such a manner as to eliminate cross-color and cross-luminance interference.

SUMMARY OF THE INVENTION

In accordance with the principles of the present invention, input terminals receive relatively wideband brightness and relatively wideband color difference signals. A first filter means is coupled to the color difference signal input terminal and generates a signal occupying a first region of a predetermined spatio-temporal frequency space. A second filter means is coupled to the brightness signal input terminal and generates a signal occupying a second region of the predetermined spatio-temporal frequency space which does not include the frequencies occupied by the first region. A utilization means includes an encoder which forms a composite video signal from the output signals of the color difference and brightness representative signal filter outputs wherein the encoded brightness and color difference signals occupy mutually exclusive spatio-temporal frequency spaces.

BRIEF DESCRIPTION OF THE DRAWINGS

In the drawings,

FIGS. 13 and 15 are block diagrams of filters which may be used in the circuit of FIG. 4;

FIGS. 19 and 21 are block diagrams of filters which may be used in the circuit of FIG. 4.

DETAILED DESCRIPTION

Figure 1:
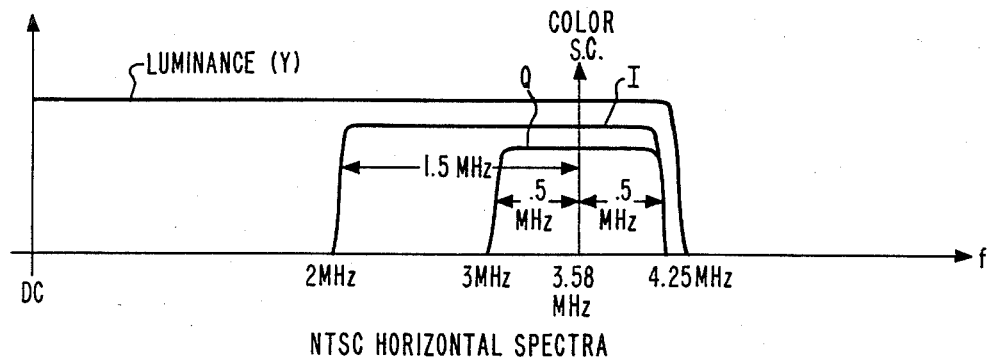
FIG. 1 is a spectral diagram showing the spectra of the various components of a composite video signal.

FIG. 1 shows the spectral locations of the various components of an NTSC baseband composite television video signal. The luminance component occupies the band of freqencies from DC to approximately 4.25 MHz. The color subcarrier is located at approximately 3.58 MHz. The sidebands around the color subcarrier containing the Q component occur in the frequency space 0.5 MHz on either side of the subcarrier, and the sidebands containing the I information occur in the frequency space from 0.5 MHz above the subcarrier to 1.5 MHz below the color subcarrier. The FIG. 1 spectrum is sometimes described as the horizontal spectrum because it describes the frequencies of the various components in the horizontal direction in the reproduced image.

The reproduced image has not only a horizontal dimension, but also a vertical dimension. The frequency of components in the vertical direction is limited by the number of scan lines in the picture. The maximum frequency in the vertical direction is equal to one-half the total number of lines making up the reproduced image. In the NTSC system, there are 525 lines in a reproduced image and thus, the maximum number of cycles (black to white) that can be reproduced in the vertical direction is $262\frac{1}{2}$ cycles per picture height.

In addition, because the picture can change over time, the reproduced image must be considered to have a third dimension called the temporal dimension. In the NTSC system, the image is scanned as a repetitive series of frames, each frame containing 525 horizontal scan lines from top to bottom of the picture. Each frame of an NTSC picture consists of two interlaced fields, each having $262\frac{1}{2}$ scan lines from the top to the bottom of the picture. The time period between frames is 1/30 of a second, and the time period between fields is 1/60 of a second.

The maximum frequency that can be transmitted in the temporal direction corresponds to the fastest rate that the image can change from black to white and back to black. This corresponds to alternating fields of black and white. Thus, the maximum repitition rate is 1/30 of a second.

Figure 2:
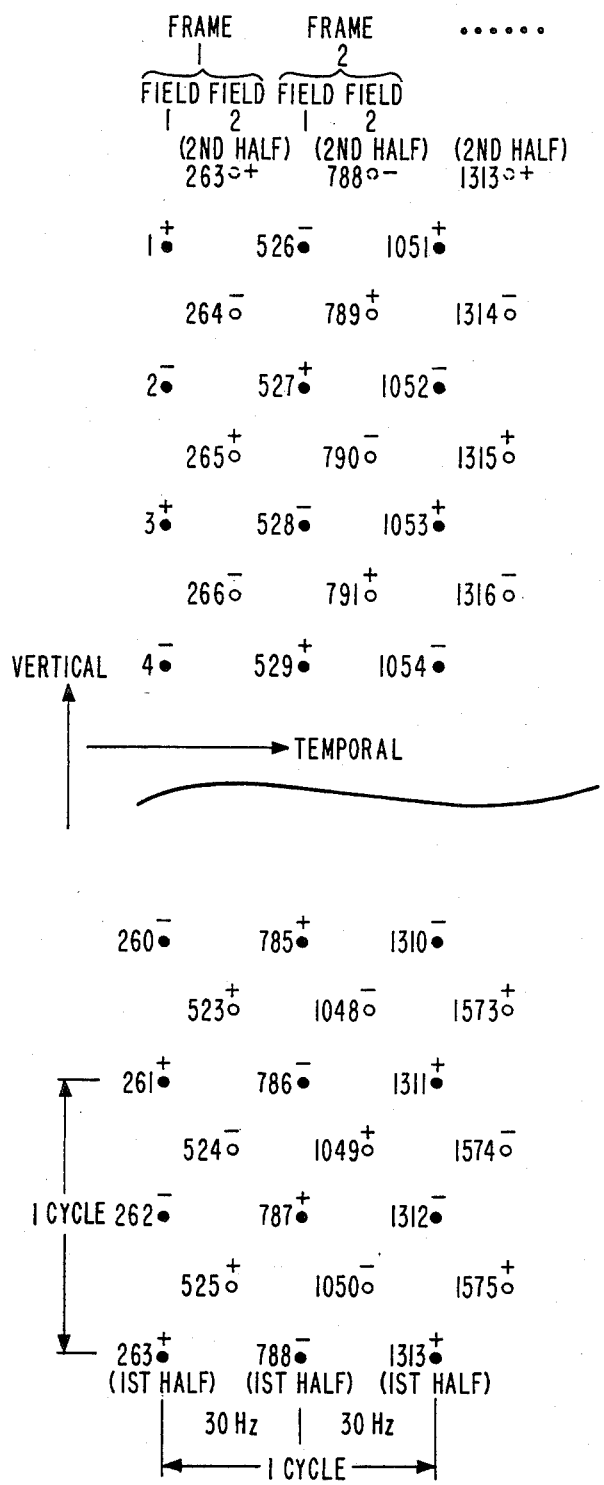
FIG. 2 is the vertical-temporal representation in the time domain of a composite television video signal.

FIG. 2 shows the physical representation of a television signal in the vertical and temporal directions. In the vertical direction, the dots and circles represent the horizontal scan lines, viewed on end, of the displayed television image. The small numbers beside the dots and circles indicate the number of the scan line. The scan lines of the first and alternate (or odd) fields are indicated by small dots. Dot 1 is the top horizontal line of the first field, dot 2 is the second horizontal scan line of the first field, etc. There are only 262 and one-half scan lines in each field, so only the first half of scan line 263 is in field one. The second half of scan line 263 is the top line of field 2. The scan lines of the second and alternate (or even) fields are indicated by small circles. The interlaced scanning of the picture, locates the scan lines of the second field between the scan lines of the first field. The + and − signs above the dots represent the relative phase of the color subcarrier at that horizontal line.

The horizontal axis in FIG. 2, indicates the temporal direction or the field progression in time, and the vertical axis indicates the vertical direction of the reproduced image. Because the composite video signal can be represented in the vertical and temporal directions at only discrete locations, it is seen that the video signal, though continuous, is in fact a sampled data system. The information that can be represented in these directions, is limited by the effective vertical and temporal sampling frequencies. Spatial vertical and image motion frequencies which are greater than one-half the respective sampling frequency will result in aliasing and degradation of the reproduced signal.

The subcarrier when conceived as a two dimensional wave in the vertical and temporal direction can be visualized as a wave having respective peaks and troughs running from lower left to upper right. For example, a peak runs along a diagonal formed by lines 3, 265, 527, 789 1051 and the trough runs along a diagonal formed by lines 4, 266, 528, 790, 1052, 1314. The direction of the wave generated by this subcarrier runs from upper left to lower right.

Figure 3:
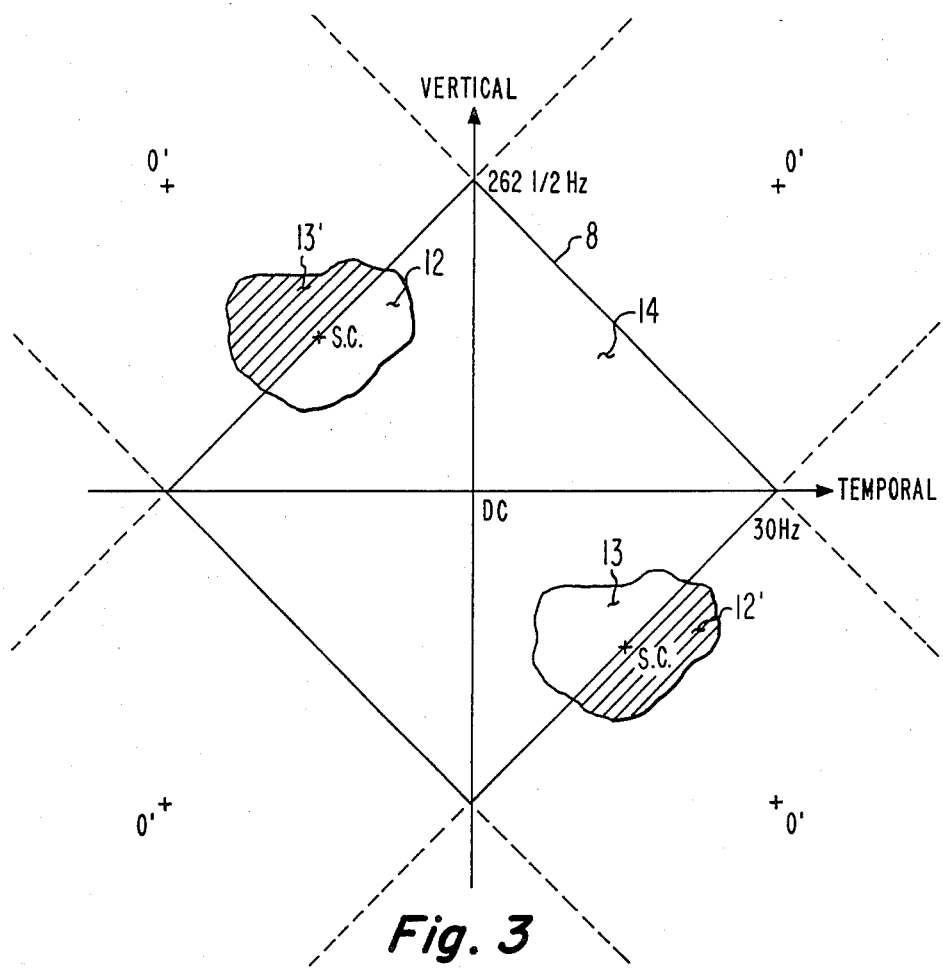
FIG. 3 is a spectral diagram of the two dimensional vertical temporal spectrum of the composite television video signal showing the position of the color subcarrier and its sidebands.

FIG. 3 is the frequency spectrum of an NTSC video signal in vertical-temporal frequency space. The vertical axis represents the frequency of the video signal in the vertical direction and the horizontal axis represents the frequency of the video signal in the temporal dimension. The baseband frequency space is in the region marked by diamond 8. Images of the baseband frequency space exist at multiples of the sampling frequencies. For example, images of the origin DC exist at the points marked O′.

It is known in two dimensional frequency analysis that the frequency spectrum of two-dimensional signals runs on a line passing through the origin (DC point) in the same direction as the direction of the wave. For example, the two-dimensional spectrum of the color subcarrier lies on a line passing through the origin (DC point) running from upper left to lower right. One cycle of the subcarrier in the vertical direction takes four lines, for example, line 264, line 524, line 262, and line 525 (the cycle begins again on line 263). This is one-half of the maximum vertical frequency, which would take only two lines. One cycle of the subcarrier in the temporal direction takes four fields, for example, frame 1-field 1, frame 1-field 2, frame 2-field 1 and frame 2-field 2. This is one-half the maximum temporal frequency, which would take only two fields. The subcarrier is located at points S.C. on the spectral diagram of FIG. 3.

The subcarrier when modulated by color difference information generates sidebands around the location of the color subcarrier S.C. These sidebands are contained in the regions 12, 13, 12' and 13'. Regions 12 and 13 are the sidebands within the baseband frequency space. Regions 12' and 13' are the images of regions 12 and 13 respectively.

In a color television receiver, it is required to separate the luminance from the chrominance component. Complete separation can only be done if the chrominance information is restricted to be within the regions 12 and 13 shown in FIG. 3 and the luminance information is restricted to be in region 14 and not in the regions 12 and 13, i.e. in mutually exclusive frequency regions.

Figure 4:
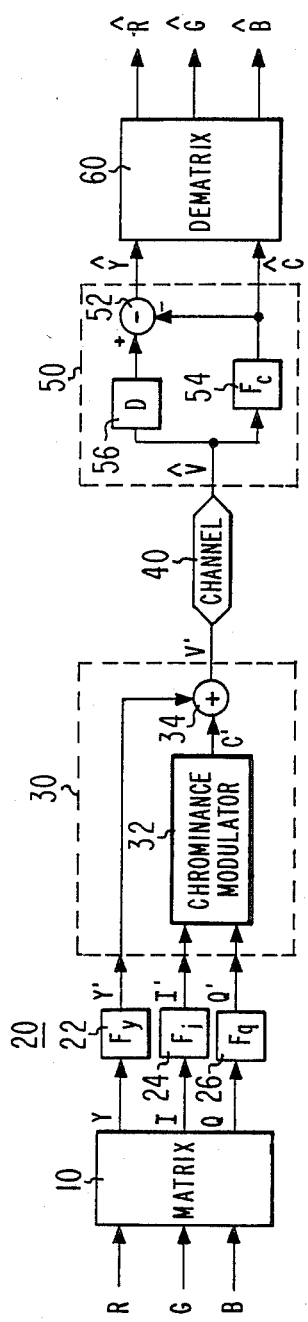
FIG. 4 is a block diagram of video signal filtering and encoding apparatus according to the present invention.

FIG. 4 illustrates a circuit which restricts the luminance and chrominance information in this manner. Relatively wideband red (R), green (G), blue (B) information from, for example, a color television camera (not shown), is fed into a matrix 10 which generates a brightness representative luminance signal Y and two color difference signals I and Q. The luminance and color difference signals are processed by filters 20 which filter the signal in the horizontal, vertical and temporal directions. Such filters are generally referred to as spatio-temporal filters. The filtered luminance and color difference signals Y', I' and Q' respectively, are supplied to a composite video signal encoder 30 which generates a composite video signal V'. The encoder 30 includes a chrominance modulator 32 which generates a modulated chrominance signal C' from the filtered color difference signals I' and Q'. The modulated chrominance signal C' is combined with the luminance signal Y' in adder 34 to generate the composite video signal V'.

The spatio-temporal filters 20 consist of a luminance filter 22 and color difference filters 24 and 26 for the I and Q signals respectively. Referring to FIG. 3, the spatio-temporal filters 24 and 26 restrict the I and Q color difference signals in the vertical and temporal dimensions to a predetermined baseband frequency space corresponding in shape to the regions 12 and 12', and 13 and 13' surrounding the subcarrier S.C. The I spatio-temporal filter 24 and Q spatio-temporal filter 26 (of FIG. 4) restrict the I and Q signals in the horizontal direction to the I and Q spectra shown in FIG. 1 respectively. Thus the I and Q signals at the output of the spatio-temporal filters 24 and 26 are restricted in the vertical, horizontal and temporal frequency domains to a predetermined frequency space.

Luminance spatio-temporal filter 22 acts as a three dimensional notch filter for the luminance signal. This filter is arranged so that the luminance signal is restricted to the region 14 illustrated in FIG. 3. In this way, the composite video signal when generated, has a luminance component with no chrominance signal component and a chrominance component with no luminance signal component. This permits the luminance and chrominance signals to be separated in the receiver without any luminance/chrominance crosstalk.

Referring again to FIG. 4, the composite video signal V' is coupled to a receiver through a communication channel 40 which may include a broadcast transmitter or a video tape recorder/reproducer, for example. The output of the communications channel is a received composite video signal $\hat{V}$. In the receiver, the composite video signal is applied to a composite video signal decoder 50 which generates a received luminance component $\hat{Y}$ and a received chrominance component $\hat{C}$. The received luminance and chrominance components $\hat{Y}$ and $\hat{C}$ respectively are fed to a dematrixing circuit 60 which generates received red, green and blue signals $\hat{R}, \hat{G}$ and $\hat{B}$ for driving a display device (not shown).

The composite video signal decoder 50 has a chrominance spatio-temporal filter 54 for extracting only the chrominance component $\hat{C}$ from the received composite video signal $\hat{V}$. A subtractor 52 subtracts the chrominance component $\hat{C}$ from the composite video signal $\hat{V}$ delayed by delay 56 to compensate for delay in filter 56 to produce the luminance component $\hat{Y}$.

The chrominance spatio-temporal filter 54 has a frequency response characteristic which passes only signals lying in the frequency space illustrated as regions 12, 13, 12' and 13' in FIG. 3. The output of filter 54 is the chrominance component only, because the luminance signal was restricted to region 14 by the spatio-temporal filters 20 in the transmitting end. By using separate filters in the respective luminance and color difference signal lines in the transmitting end, the amount of crosstalk at the junction of regions 12 and 13 and region 14 in FIG. 3 can be tailored to be at any desired level.

Figure 5B:
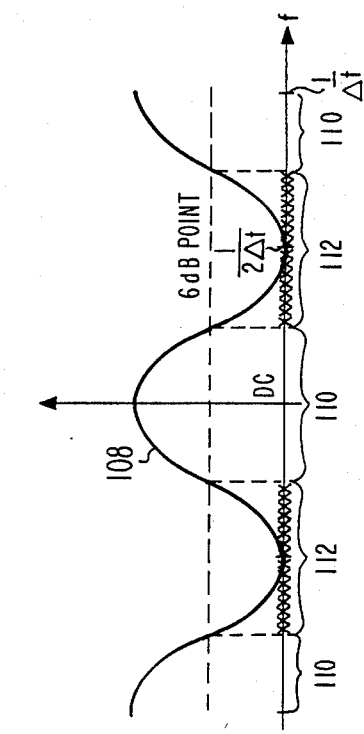
FIG. 5B is a spectral diagram showing the response characteristic of the filter.
Figure 5A:
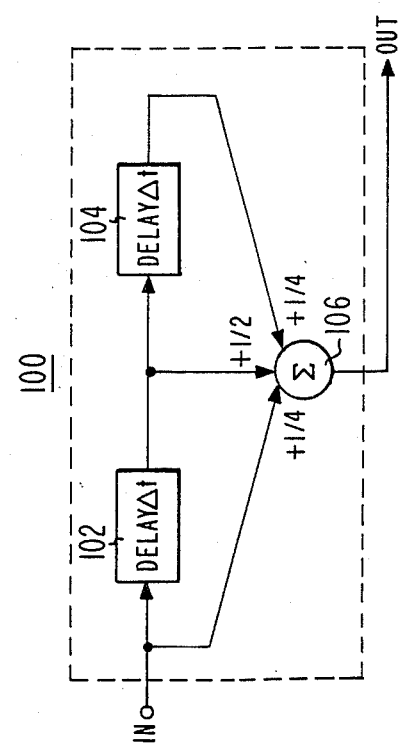
FIG. 5A is a block diagram of a filter which may be used in the circuit of FIG. 4.

FIG. 5A shows one possible filter which can be used in any of the spatio-temporal filters 20 or 54 illustrated in FIG. 4. The frequency response characteristic of this filter is shown in FIG. 5B. The frequency response is a function of the delay periods of delay elements 102 and 104. The delay introduced by the delay elements will be referred to as the sampling interval. The signal could, of course, be sampled at a higher rate. The delay elements 102 and 104, in such a system, would comprise sufficient storage elements to provide the desired sampling interval between the input and output of the delay element.

The signal to be filtered is applied to input terminal IN. The signal is coupled to the input of a cascade connection of two delay elements 102 and 104 each having a delay of one sampling interval $\Delta t$. Signals from the input terminal and the outputs of delay elements 102 and 104 are weighted and coupled to an adder 106. The respective weighting factors are indicated by the fractions shown next to the signal lines. That is, the signal at the input terminal is weighted by $+\frac{1}{4}$, the signal at the output of the delay element 104 is weighted by $+\frac{1}{4}$ and the signal at the output of delay element 102 is weighted by $+\frac{1}{2}$. The weighting can be done, for instance, by weighting function circuits which act as multipliers. The weighting could also be done by shift-and-add weighting function circuits or ROM multipliers or, as in this case, where the weighting factors are inverse powers of two, by simple hard wire shifting of the input signal at the adder 106.

FIG. 5B shows the frequency response characteristic of the filter shown in FIG. 5A. The particular filter shown has a response characteristic 108 in the shape of a raised-cosine. This filter has a peak at DC and a null at a frequency corresponding to $\frac{1}{2}\Delta t$. This response characteristic repeats itself over the entire spectrum. That is, peaks occur again at 1/Δt, 2/Δt and so forth. The passband is in the frequency regions 110, and the stopband is in regions 112 marked with small x's.

Figure 6A:
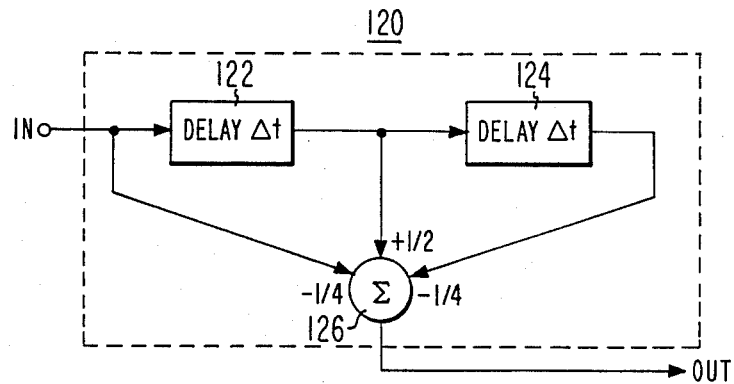
FIG. 6A is a block diagram of a further filter which may be used in the circuit of FIG. 4
Figure 6B:
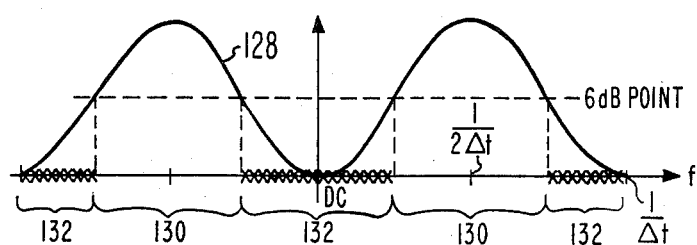
FIG. 6B is a spectral diagram showing the response characteristic of this filter.

FIG. 6A and 6B shows another filter which can be used in any of the spatio-temporal filters illustrated in FIG. 4. The structure of filter 120 is the same as the structure of filter 100 in FIG. 5A, but the weighting factors are different. The weighting factor of the signal from the input of delay element 122 is $-\frac{1}{4}$ and the weighting factor of the signal at the output of delay element 124 is also $-\frac{1}{4}$. The weighting factor of the signal at output of delay element 122 is $+\frac{1}{2}$. The response characteristic of this filter is shown in FIG. 6B. This filter has a null at DC and a peak at $\frac{1}{2}$Δt.

Figure 7B:
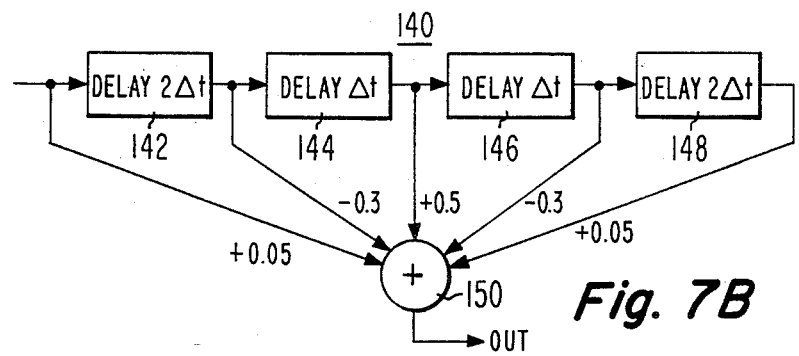
FIGS. 7A, 7B, and 8A and 8B are alternate filters which may be used in the circuit of FIG. 4.
Figure 7A:
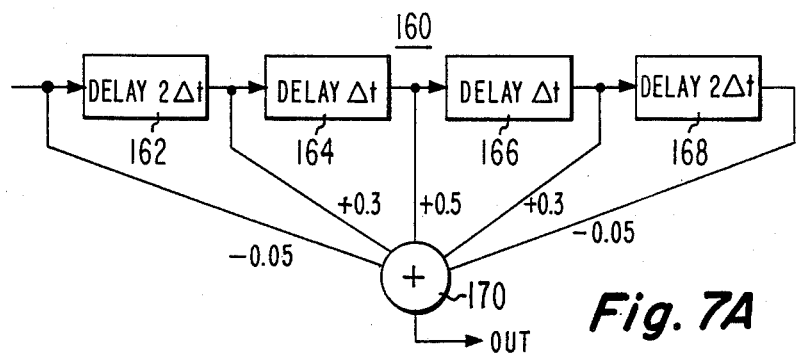

FIG. 7A and 7B show two other filters which can be used in the spatio-temporal filters illustrated in FIG. 4. The response characteristics of the filter illustrated in FIG. 7A is similar to that illustrated in FIG. 5A in that it has a peak at DC and a null at $\frac{1}{2}$Δt. It differs in that the shape has a sharper cutoff and is flatter in the regions of DC and $\frac{1}{2}$Δt. This gives improved performance in the areas of the peak and the null of the filter.

The response characteristic of the filter illustrated in FIG. 7B is similar to that illustrated in FIG. 6B with the same differences described above for the filter in FIG. 7A.

The filter 160 in FIG. 7A includes the cascade connection of delay elements 162, 164, 166 and 168. Delay elements 164 and 166 each have a delay of Δt, which is the sampling interval for this filter. Delay elements 162 and 168 each have a delay of 2Δt or two sampling intervals. Adder 170 is coupled to the input of delay element 162 and to the outputs of the delay elements 162, 164, 166 and 168. The signals at the input of delay element 162 and the output of delay element 168 are both weighted by −0.05. The signals at the outputs of delay elements 162 and 166 are both weighted by +0.3. The signal at the output of delay elements 164 is weighted by +0.5.

The filter 140 illustrated in FIG. 7B corresponds to filter 160, the weighting factors are different. The signals at the input of delay element 142 and output of delay element 148 are both weighted by +0.05. The signals at the outputs of delay elements 142 and 146 are both weighted by −0.3. The signal at the output of delay elements 144 is +0.5.

The weighting function circuits of filters 140 and 160 could be comprised of circuitry to generate the sums of binary weights selected so as to approximate the weighting factor desired. This would lead to a simplified circuit at the expense of accuracy of weighting factors and of response characteristics.

A filter of this type gives improved performance over the filters illustrated in FIGS. 5A and 6A but requires delay elements having 6Δt of delay as opposed to 2Δt of delay for the filters of FIGS. 5A and 6A.

Figure 8A:
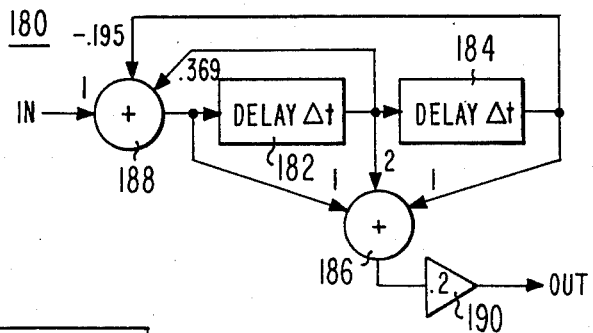
Figure 8B:
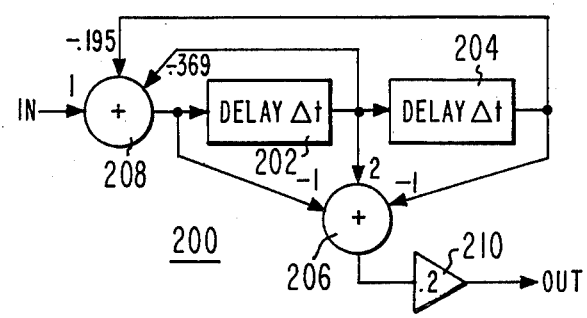

FIGS. 8A and 8B illustrate filters having improved response characteristics similar to those of the filters illustrated in FIGS. 7A and 7B but without the requirement for added delay elements. The filter 180 in FIG. 8A includes a cascade connection of delay elements 182 and 184 each having a delay of one sampling interval. An adder 186 sums weighted signals from the input of the delay element 182 and the outputs of delay elements 182 and 186. The signal at the input of delay element 182 is weighted by a factor of 1; the signal at the output of delay element 184 is weighted by a factor of 1; and the signal at the output of delay element 182 is weighted by a factor of 2. The output of adder 186 is coupled to a further weighting circuit 190 which weights that signal by a factor of 0.2. This normalizes the output signal of the filter to the input signal.

A second adder, 188, has one input coupled to the input terminal of the filter 180; a second input coupled to the output of delay element 184; a third input coupled to the output of delay 182 and an output coupled to the input of delay element 182. The signal from the input of the filter 180 to adder 188 is weighted by a factor of 1; the signal from the output of delay element 184 is weighted by a factor −0.195; and the signal from the output of delay element 182 is weighted by a factor of 0.369.

The filter 200 illustrated in FIG. 8B corresponds to filter 180 of FIG. 8A, but the weighting factors are different. The signals applied to adder 206 from the input of delay element 202 and the output of delay element 204 are both weighted by a factor of −1; the signal from the output of delay element 202 remains the same at 2. The signals applied to adder 208 from the output of delay element 202 is weighted by a factor of −0.369; and the signal from the output of delay element 204 is −0.195.

Filter 200 operates in a similar manner to filter 180 except that it has a frequency response characteristic similar to that of filter 140 of FIG. 7B, having a response null at DC.

A person skilled in the art of two dimensional filters knows that the filter response runs in the same direction as the sampling direction. That is, if the signal to be filtered is represented by the two dimensional array of samples in FIG. 2, and the filter weights and sums samples selected from a row of points running from left to right, then the response of the filter in the two dimensional frequency space also runs from left to right. Alternatively, if samples of a composite television video signal are selected from the two-dimensional array in the direction from lower left to upper right, then the frequency response in the vertical temporal frequency space will also run from lower left to upper right. For example, if samples are taken from lines 3, 265, 527, 789 and 1051, then the frequency response (referring to FIG. 3) will run from the lower left to the upper right.

In the particular case described above, the sampling interval is 262 lines. Any of the filters described in FIGS. 5A, 6A, 7 or 8 using a sampling interval of 262 lines will produce a filter response running from lower left to upper right.

Figure 9:
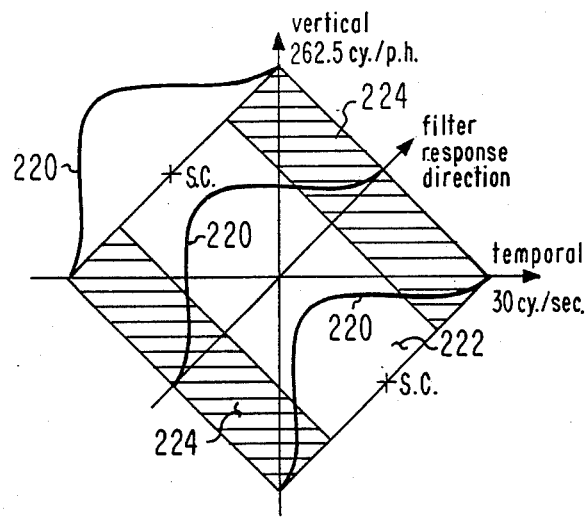
FIGS. 9, 10, 11 and 12 are all two dimensional spectral diagrams showing the response characteristic of the filters of FIGS. 5A, 6A, 7A, 7B, 8A and 8B.

FIG. 9 illustrates the two dimensional filter response of a filter having a sampling interval of 262 lines and having a peak response at DC. The central arrow directed from lower left to upper right shows the filter response direction. The lines 220 illustrate the frequency response characteristic of the filter in a three dimensional sense. There is a peak at DC and a null at $\frac{1}{2}$Δt, where Δt is the sampling interval. The crosshatch areas 224 illustrate the stopband and the clear area 222 illustrates the area representing the passband of the filter.

Figure 10:
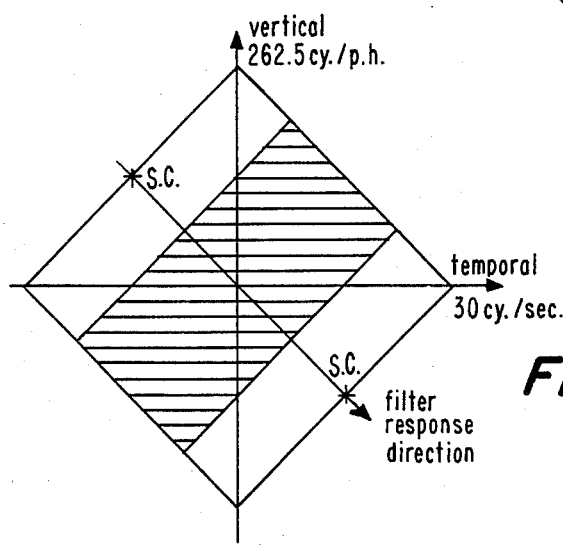

FIG. 10 illustrates the response characteristic of a filter having a 263 line sampling interval, and having a response null at DC. Referring to FIG. 2, the sampling direction runs from upper left to lower right. For example, samples from lines 1, 264, 527, 790, 1053 and 1316 may be used. If weighting factors of filters are adjusted properly, the response stopband will correspond to the crosshatch areas and the response passband will correspond to the clear areas of FIG. 10. For example, the weighting factors of filters illustrated in FIGS. 6A, 7B and 8B will produce this response characteristic.

Figure 11:
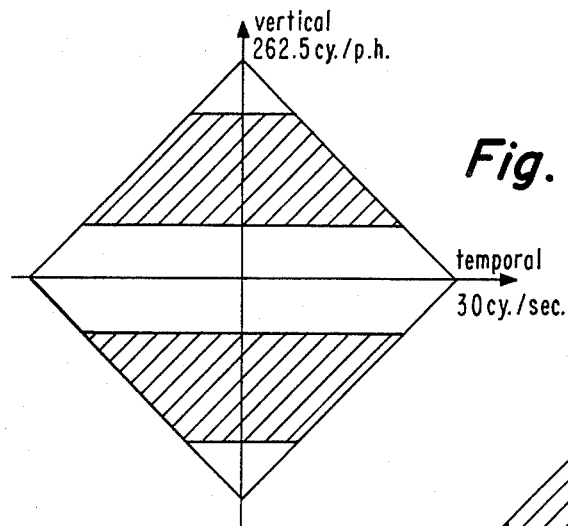

In a similar manner, FIG. 11 shows the response characteristic of a filter having a sampling interval of one line which operates on samples selected along a vertical column taken from top to bottom. Referring to FIG. 2, for example, lines 1, 2, 3 and 4 may be used. FIG. 11 is the response characteristic of such a filter.

Figure 12:
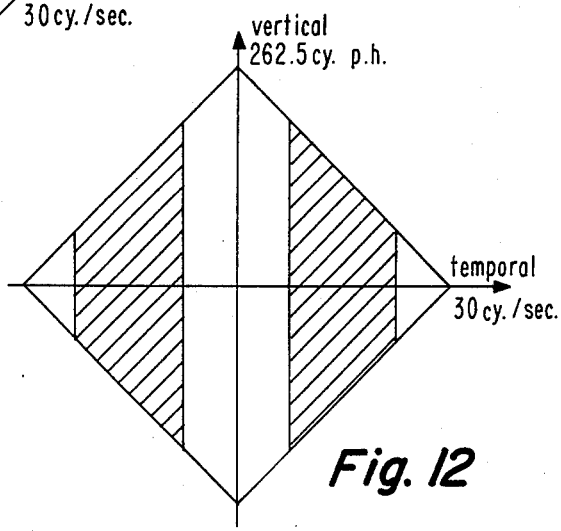

FIG. 12 shows the response characteristic of a filter which operates on samples running from left to right. Referring to FIG. 2, for example, lines 1, 526 and 1051 may be used. The sampling interval of this filter is 525 lines and it is an example of a frame filter having a response peak at DC.

Filters having the frequency response characteristics shown in FIGS. 9, 10, 11 and 12 and their complements; and filters generating the response characteristics shown in FIG. 1 in the horizontal direction may be combined to form the spatio-temporal filters 20 and 54 of FIG. 4.

In the description below, filters are characterized as line sampled filters, 262 line sampled filters, 263 line sampled filters, and frame sampled filters. The characterizations refer to the sampling interval of the filter.

A line sampled filter operates on samples separated in time by one, or a small number of horizontal line intervals. For example, the delay elements 102 and 104 in FIG. 5A would each delay the signal passing through it by one horizontal line interval. The delay elements 142 and 148 in FIG. 7B would each delay the signal passing through it by two horizontal line intervals.

Similarly, a 262 line sampled filter operates on samples separated in time by one or a small number of 262 horizontal line intervals; a 263 line sampled filter by one or a small number of 263 horizontal line intervals; and a frame sampled filter by one or a small number of frame intervals (525 horizontal lines).

Figure 14A:
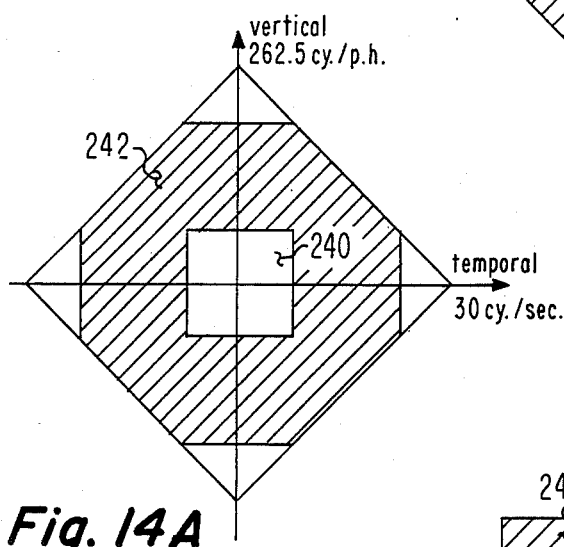
FIGS. 14A and 14B are two dimensional spectral response characteristics of the filters in FIG. 13.
Figure 14B:
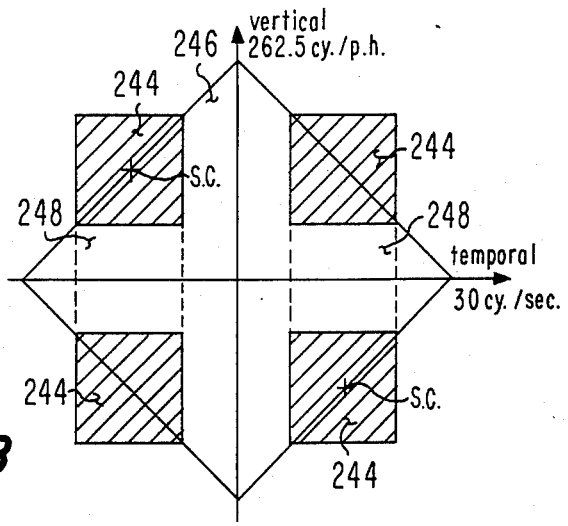

FIG. 13 illustrates the spatio-temporal filters 20 (of FIG. 4) which generate the frequency response characteristics illustrated in FIGS. 14A and 14B. Spatio-temporal filters 24 and 26 which condition I and Q signals respectively each include the serial connection of a low pass filter (260,270), a frame sampled filter (262,272) having a peak response at DC, and a line sampled filter (264,274) having a peak response at DC. The line sampled filters having the peak response at DC (264 and 274) have the frequency response characteristic illustrated in FIG. 11. The frame sampled filters having the peak response at DC (262 and 272) have the frequency response characteristic illustrated in FIG. 12. The serial combination of these two filters generates the response characteristic illustrated in FIG. 14A with the passband occupying the region 240 and the stopband occupying the region 242. The low pass filter 260 in the I channel has a passband of 1.5 MHz and restricts the I signal to the frequency bandwidth illustrated in FIG. 1 for the I signal. The low pass filter 270 in the Q channel has a pass band of 0.5 MHz and restricts the Q signal to the frequency band illustrated in FIG. 1 for the Q signal.

The sampling rate of the I and Q signals may be reduced after the lowpass filters 260 and 270, because the Nyquist rate is reduced due to the narrower bandwidth. This, in turn, permits the number of storage elements in the filters 262, 264, 272 and 274 to be reduced.

Spatio-temporal filter 22 in the luminance channel attenuates the luminance signal in the frequency space to be occupied by the modulated chrominance component. It includes the serial connection of a high pass filter 280; a frame sampled filter 282 having a null at DC and a line sampled filter 284 having a null at DC. This serial connection passes only that portion of the luminance signal in the frequency space to be occupied by the modulated chrominance signal, illustrated as regions 244 in FIG. 14B. The high pass filter 280 has a passband above 2 MHz and restricts the luminance signal Y to the portion of the spectrum shared with the modulated I and Q signals.

A delay 288 passes the luminance component unchanged but with a delay sufficient to compensate for the delays introduced by the filters 280, 282 and 284. A subtractor 286 subtracts that portion of the luminance signal in the frequency space to be occupied by the chrominance signal from the unchanged delayed luminance signal. The filtered luminance signal Y' produced has an output frequency characteristic corresponding to that illustrated as region 246 in FIG. 14B.

Figure 15:
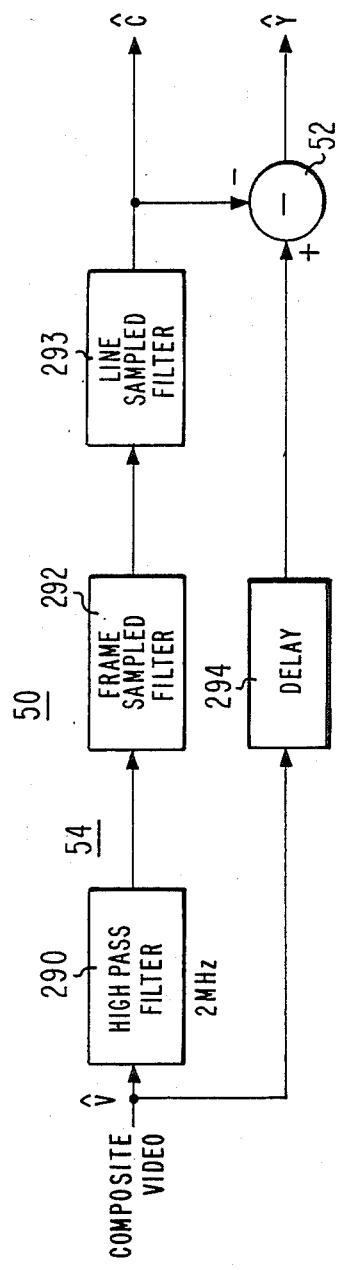

FIG. 15 illustrates the composite video signal decoder 50 (as shown in FIG. 4) which complements the composite video signal encoder 20 illustrated in FIG. 13. The chrominance spatio-temporal filter 54 is the serial connection of a 2 MHz high pass filter 290, a frame sampled filter 292 having a null at DC and a line sampled filter 293 having a null at DC. Filter 54 produces the chrominance component $\hat{C}$ of the composite video signal $\hat{V}$ and has a response characteristic which passes only the sidebands 244 of the color subcarrier in FIG. 14B. The chrominance component $\hat{C}$ is then subtracted from the composite video signal $\hat{V}$ in subtractor 52. Composite video signal $\hat{V}$ is coupled to subtractor 52 via delay element 292 which compensates for the processing delays of filter 54. The output produced by subtractor 52 is the luminance component $\hat{Y}$.

In chrominance/luminance separators employing simple frame comb filters, motion detection must be provided to differentiate luminance components which are moving (i.e. have high frequencies in the temporal direction) from chrominance components. Referring to FIG. 14B, moving luminance components occupy regions 248 and the chrominance component occupies regions 244. The frame comb filter response characteristics shown in FIG. 12 does not differentiate between these two regions. The filters shown in FIGS. 13 and 15 can differentiate these two regions, and thus no motion detection is required.

Figure 16:
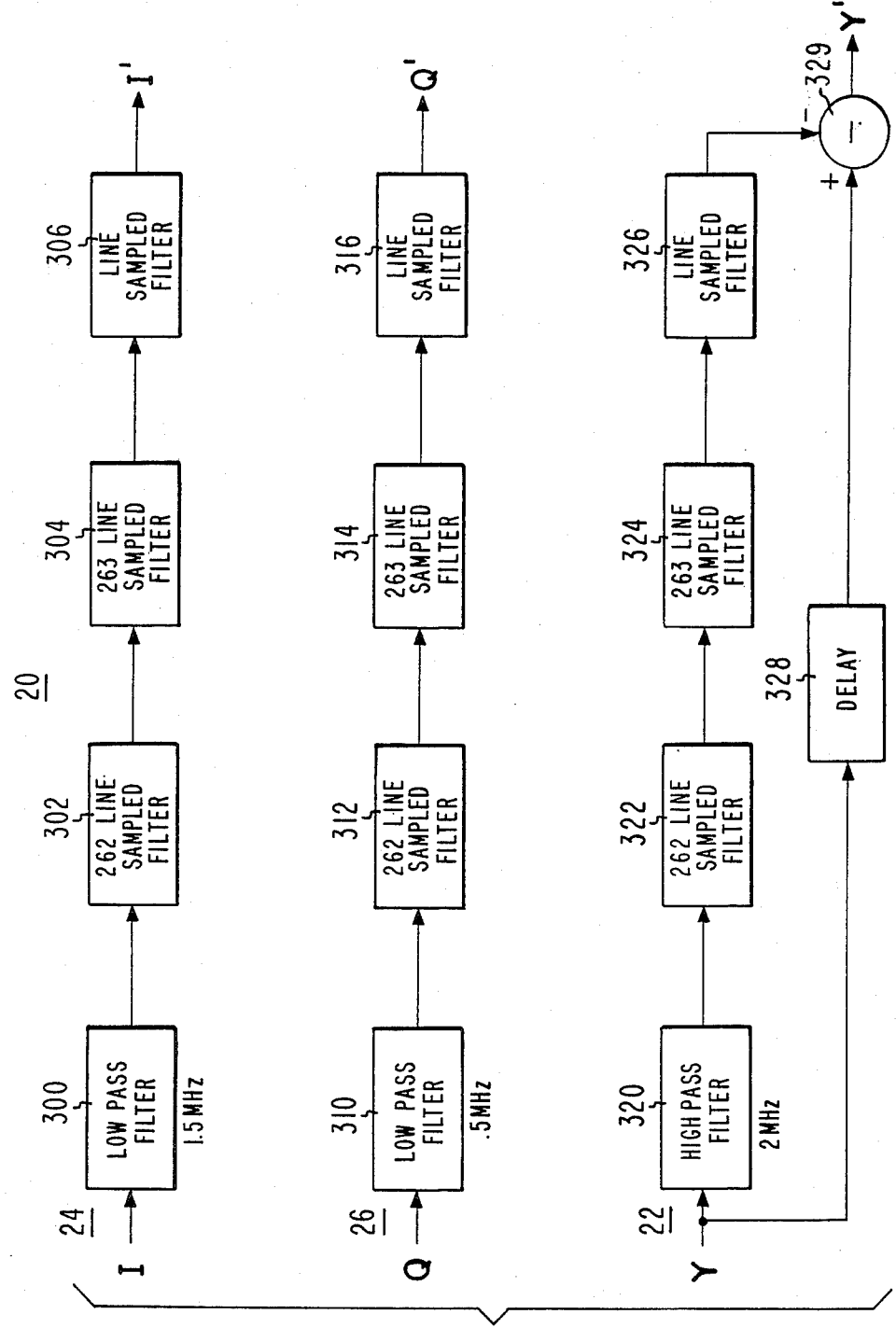
Figure 17A:
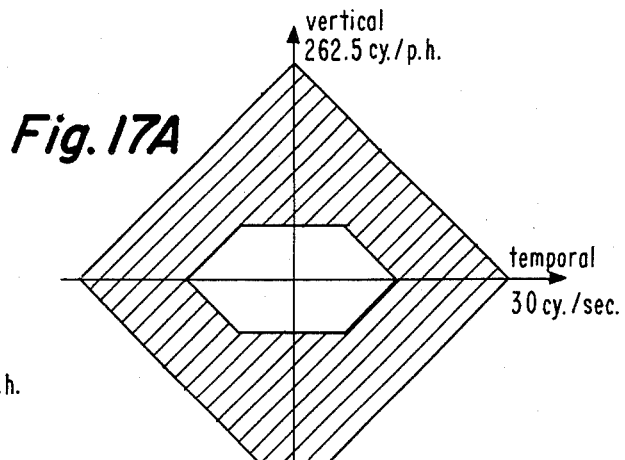
FIGS. 17A and 17B are two dimensional spectral response characteristics of the filters in FIG. 16.

FIG. 16 illustrates another set of spatio-temporal filters which may be substituted for filter 20 in FIG. 4. In FIG. 16, the I and Q spatio-temporal filters 24 and 26 respectively, each includes a serial connection of a low pass filter, either 1.5 MHz (300) or 0.5 MHz (310); a 262 line sampled filter (302,312) having a peak response at DC; a 263 line sampled filter (304,314) having a peak response at DC and a line sampled filter (306,316) having a peak response at DC. This combination produces the frequency response characteristic illustrated in FIG. 17A and is the combination of the frequency response characteristics illustrated in FIGS. 9 and 11 plus the inverse of the characteristic illustrated in FIG. 10.

Figure 17B:
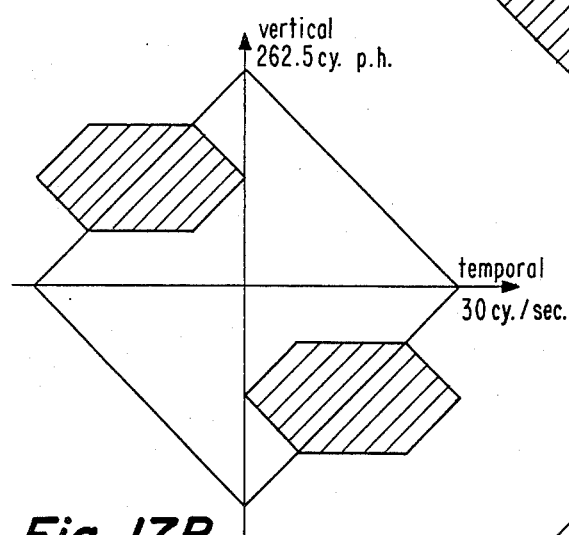

The luminance spatio-temporal filter 22 is the serial connection of a 2 MHz high pass filter 320; a 262 line sampled filter 322 having a peak at DC; a 263 line sampled filter 324 having a null at DC; and a line sampled filter 326 having a null at DC. The serial connection of filters 320, 322, 324 and 326 have a response characteristic which corresponds to the combination of the response characteristics illustrated in FIG. 9, FIG. 10 and the inverse response characteristic of FIG. 11. The output of line sampled filter 326 is coupled to a subtractor 329 to which luminance signal Y is coupled via compensating delay element 328. Subtractor 329 produces a luminance signal Y' in which the frequence spaces to be occupied by the chrominance component have been cleared of luminance signal. The response characteristic of filter 22 is illustrated in FIG. 17B.

Figure 18:
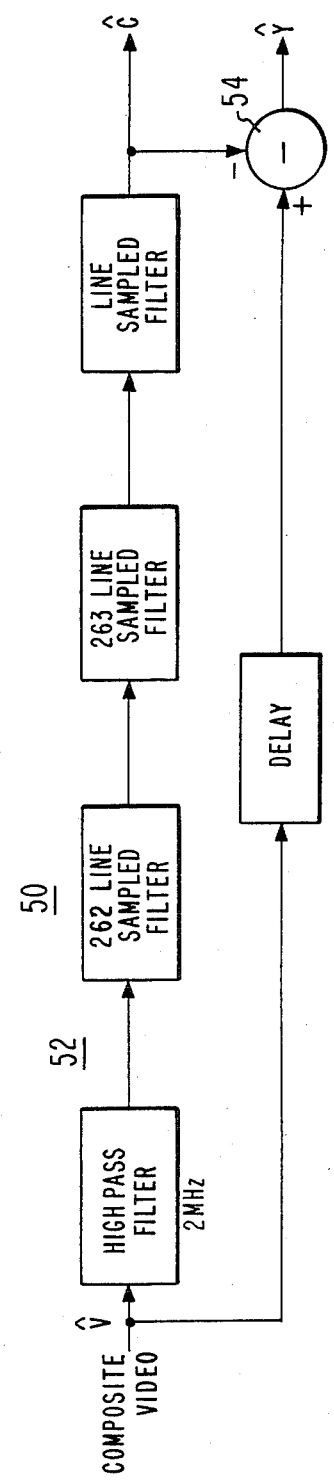
FIGS. 16 and 18 are block diagrams of filters which may be used in the circuit of FIG. 4.

FIG. 18 shows the composite video signal decoder 50 which complements the encoder 30 preceded by the filters illustrated in FIG. 16. The composite video signal $\hat{V}$ is applied to the chrominance spatio-temporal filter 52. This filter includes the serial connection of a 2 MHz high pass filter; a 262 line sampled filter having a null response at DC; a 263 line sampled filter having a peak response at DC; and a line sampled filter having a null response at DC. The serial connection produces the chrominance component $\hat{C}$. Subtractor 54 subtracts the chrominance component $\hat{C}$ from the delayed composite video signal $\hat{V}$ leaving only the luminance component $\hat{Y}$.

Figure 20A:
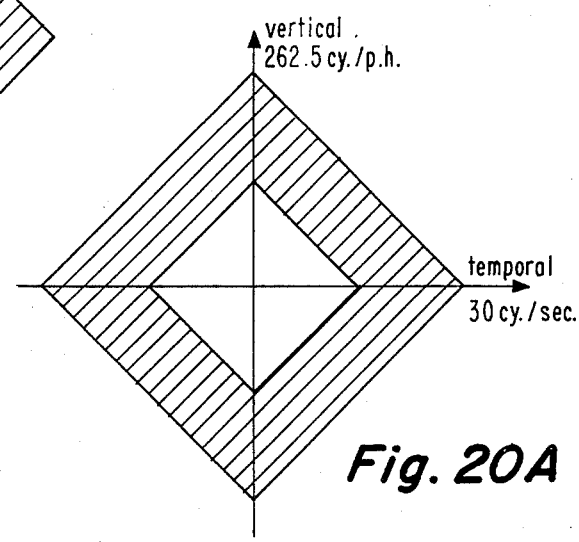
FIGS. 20A and 20B are two dimensional spectral response characteristics of the filters in FIG. 19.
Figure 20B:
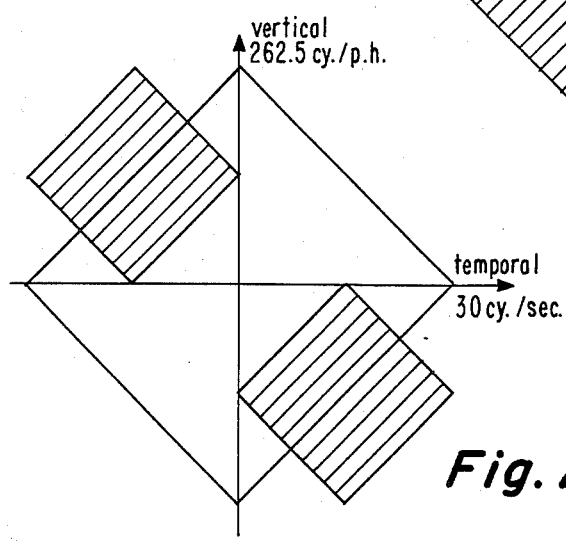
Figure 19:
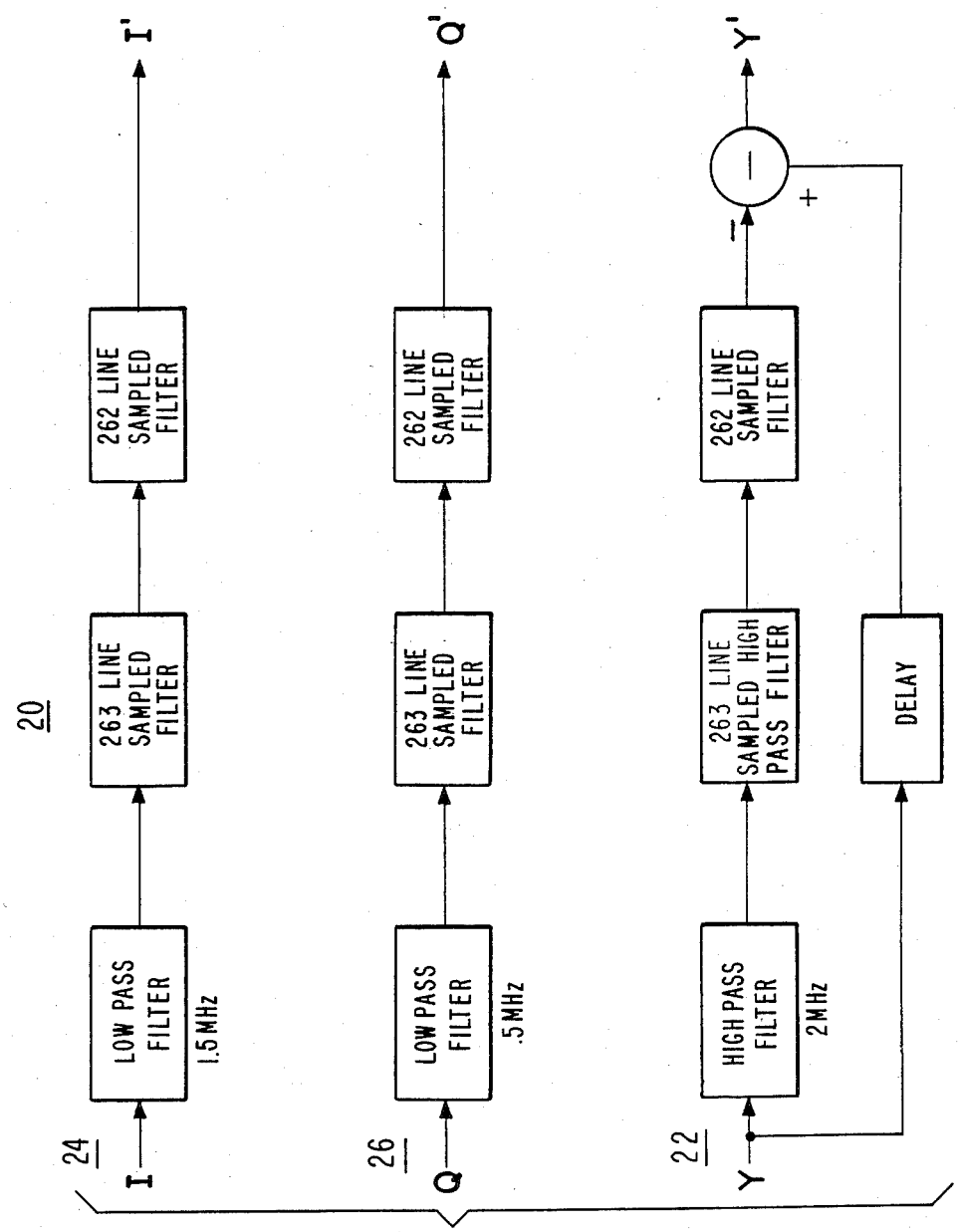

FIG. 19 shows the spatio-temporal filters 20 (of FIG. 4) which will generate the response characteristics illustrated in FIG. 20A and 20B. The I and Q spatio-temporal filters 24 and 26 respectively, each include a serial connection of a 1.5 MHz or 0.5 MHz low pass filter; a 263 line sampled filter having a peak response at DC; and a 262 line sampled filter having a peak response at DC. In the vertical-temporal domain, this corresponds to the combination of the filter response characteristics of FIG. 9 and the inverse response characteristic of FIG. 10.

The spatio-temporal filter 22 in the luminance channel includes the serial connection of a 2 MHz high pass filter; a 263 line sampled filter having a null response at DC; and a 262 line sampled filter having a peak response at DC. The serial connection generates a luminance signal restricted to that portion of the frequency space to be occupied by the modulated chrominance component. A subtractor subtracts this portion of the luminance signal from the delayed luminance signal to generate the filtered luminance component Y' having a response characteristic illustrated in FIG. 20B.

FIG. 21 shows the composite video signal decoder 50 (of FIG. 4) required to complement the filter of FIG. 19. The composite video signal $\hat{V}$ is supplied to the serial connection of a high pass filter; a 263 line sampled filter having a null response at DC; and a 262 line sampled filter having a peak response at DC. The output of serial combination is the chrominance component $\hat{C}$. This chrominance component $\hat{C}$ is subtracted from the delayed composite video signal $\hat{V}$ to generate the luminance component $\hat{Y}$.

The filters illustrated from FIGS. 13 to 21 are examples of filters which may be used as a spatio-temporal filters 20 and 54 in the video signal processing circuitry illustrated in FIG. 4. Other filters may be synthesized and are considered to be within the scope of the present invention.

What is claimed is:

1. Video signal processing apparatus, comprising:
respective input terminals for applying a luminance signal and a color difference signal representative of a scene;
first filter means having an input coupled to said color difference signal input terminal, and having an output, for generating a filtered color difference signal occupying a first region of a predetermined spatio-temporal frequency space;
second filter means having an input coupled to said luminance signal input terminal, and having an output, for generating a filtered luminance signal occupying a second region of said predetermined spatio-temporal frequency space exclusive of said first region; and
utilization means, including an encoder having first and second inputs coupled to the outputs of said first and second filter means respectively, for encoding said filtered luminance and color difference signals; wherein
said filtered luminance and color difference signals are encoded to occupy mutually exclusive spatio-temporal frequency spaces to form a composite video signal.

2. The apparatus of claim 1, wherein said utilization means further comprises:
a communications channel coupled to the output of said encoder; and
a decoder coupled to the output of said communications channel for decoding said composite video signal into a luminenance component and a color representative component.

3. The apparatus of claim 2, wherein said decoder comprises:
a third filter means having an input coupled to the output of said communications channel, and an output, for producing said color representative component occupying at least a portion of said first region of said predetermined spatio-temporal frequency space; and
a subtractor having a first input coupled to the output of said communications channel and a second input coupled to the output of said third filter means, for subtracting the signal at said second input from the signal at said first input, and generating said luminance representative component.

4. The apparatus of claim 1, wherein:
said luminance and color difference signals are representative of said scene which has been scanned in an interlaced manner comprising a sequence of temporally successive frames, each frame of which comprises a plurality of fields, each field of which comprises a plurality of vertically adjacent horizontal scan lines; and
said first and second filters each comprise a sampled data filter including means for combining signals separated by time intervals of one of a line, a field and a frame.

5. The apparatus of claim 3, wherein:
said luminance and color difference signals are representative of said scene which has been scanned in an interlaced manner comprising a sequence of temporally successive frames, each frame of which comprises a plurality of vertically adjacent horizontal scan lines; and
said first, second and third filters each comprise a sampled data filter including means for combining signals separated by time intervals of one of a line, a field and a frame.

6. The apparatus of claim 1, wherein said first filter means comprises:
a first filter including means for combining signals separated by a time interval of one horizontal line and having a frequency response peak at DC;

a second filter including means for combining signals separated by a time interval of one frame and having a frequency response peak at DC; and a low pass filter for limiting the bandwidth of said color difference signal to that required for proper encoding into a composite video signal; wherein:

said first, second, and low pass filters are coupled in a serial connection.

7. The apparatus of claim 1, wherein said second filter means comprises:

a first filter including means for combining signals separated by a time interval of one horizontal line and having a frequency response null at DC;

a second filter including means for combining signals separated by a time interval of one frame and having a frequency response null at DC; and a high pass filter for passing that portion of said luminance signal occupying the same region of frequency space as the encoded color difference signal in the composite video signal; wherein:

said first, second and high pass filters are coupled in a serial connection having an input and an output; and a subtractor, having a first input coupled to the output of said serial connection, a second input coupled to the input of said serial connection, and an output coupled to the output of said second filter, for subtracting the signal at said first input from the signal at said second input.

8. The apparatus of claim 3, wherein said third filter means comprises:

a first filter including means for combining signals separated by a time interval of one horizontal line and having a frequency response null at DC;

a second filter including means for combining signals separated by a time interval of one frame and having a frequency response null at DC; and a high pass filter for passing that portion of the composite video signal containing a chrominance component; wherein:

said first, second, and high pass filters are coupled in a serial connection.

9. The apparatus of claim 1, wherein said first filter means comprises:

a first filter including means for combining signals separated by a time interval of 262 horizontal lines and having a frequency response peak at DC;

a second filter including means for combining signals separated by a time interval of 263 horizontal lines and having a frequency response peak at DC; and a low pass filter for limiting the bandwidth of said color difference signal to that required for proper encoding into a composite video signal; wherein:

said first, second, and low pass filters are coupled in a serial connection.

10. The apparatus of claim 1, wherein said second filter means comprises:

a first filter including means for combining signals separated by a time interval of 262 horizontal lines and having a frequency response peak at DC;

a second filter including means for combining signals separated by a time interval of 263 horizontal lines and having a frequency response null at DC; and a high pass filter for passing that portion of said luminance signal occupying the same region of frequency space as the encoded color difference signal in the composite video signal; wherein said first, second and high pass filters are coupled in a serial connection having an input and an output; and a subtractor, having a first input coupled to the output of said serial connection, a second input coupled to the input of said serial connection, and an output coupled to the output of said second filter, for subtracting the signal at said first input from the signal at said second input.

11. The apparatus of claim 3, wherein said third filter means comprises a serial connection of:

a first filter including means for combining signals separated by a time interval of 262 horizontal lines and having a frequency response peak at DC;

a second filter including means for combining signals separated by a time interval of 263 horizontal lines and having a frequency response null at DC; and a high pass filter for passing that portion of the composite video signal normally occupied by a chrominance component; wherein:

said first, second and high pass filters are coupled in a serial connection.

12. The apparatus of claim 9, wherein said serial connection further includes:

a third filter including means for combining signals separated by a time interval of one horizontal line and having a frequency response peak at DC.

13. The apparatus of claim 10, wherein said serial connection further includes:

a third filter including means for combining signals separated by a time interval of one horizontal line and having a frequency response null at DC.

14. The apparatus of claim 11, wherein said serial connection further includes:

a third filter including means for combining signals separated by a time interval of one horizontal line and having a frequency response null at DC.

15. The apparatus of claim 5, wherein any one of said sampled data filters comprises:

a cascade connection of a plurality of delay elements said cascade connection having an input coupled to the input of said filter, and having outputs providing signals delayed by time intervals of one of a horizontal line, a field, and a frame time period;

a plurality of weighting function circuits having respective inputs coupled to ones of said input of said cascade connection, said outputs of said cascade connection; and summing means having respective inputs coupled to said plurality of weighting means, and an output coupled to said output of said filter.

16. The apparatus of claim 15 wherein said any one of said sampled data filters further comprises:

a second plurality of weighting function circuits coupled to ones of said input and outputs of said cascade connection; and combining means having an output coupled to the input of said cascade connection, and a plurality of inputs respectively coupled to the input of said filter and to said second plurality of weighting function circuits.

17. The apparatus of claim 15 wherein:

said plurality of delay elements comprise first and second delay elements; and said plurality of weighting function circuits comprise a first weighting function circuit coupled to the input of said cascade connection having a weighting factor of substantially $\frac{1}{4}$, a second weighting function circuit coupled to an output of said second delay element having a weighting factor of substantially $\frac{1}{4}$, and a third weighting function circuit coupled to an output of said first delay element having a weighting factor of substantially $\frac{1}{2}$.

18. The apparatus of claim 15 wherein:

said plurality of delay elements comprise first and second delay elements; and said plurality of weighting function circuits comprise a first weighting function circuit coupled to the input of said cascade connection having a weighting factor of substantially $-\frac{1}{4}$, a second weighting function circuit coupled to the output of said second delay element having a weighting factor of substantially $-\frac{1}{4}$, and a third weighting function circuit coupled to the output of said delay element having a weighting factor of substantially $\frac{1}{2}$.

19. The apparatus of claim 15 wherein:

said plurality of delay elements comprise a first delay element having an input coupled to the input of said cascade connection, and an output, and having a delay of two of said time intervals; a second delay element having an input coupled to the output of said first delay element and an output, and having a delay of one of said time intervals; a third delay element having an input coupled to the output of said second delay element and an output, and having a delay of one of said time intervals; and a fourth delay element having an input coupled to the output of said third delay element and an output coupled to the output of said cascade connection and having a delay of two of said time intervals; and said plurality of weighting function circuits comprise a first weighting function circuit coupled to the input of said first delay element having a weighting factor of substantially $-0.05$; a second weighting function circuit coupled to the output of said first delay element having a weighting factor of substantially $+0.3$; a third weighting function circuit coupled to the output of said second delay element having a weighting factor of substantially $+0.5$; a fourth weighting function circuit coupled to the output of said third delay element having a weighting factor of substantially $+0.3$; and a fifth weighting function circuit coupled to the output of said fourth delay element having a weighting factor of substantially $-0.05$.

20. The apparatus of claim 15 wherein:

said plurality of delay elements comprise a first delay element having an input coupled to the input of said filter and an output, and having a delay of two of said time intervals; a second delay element having an input coupled to the output of said first delay element and an output, and having a delay of one of said time intervals; a third delay element having an input coupled to the output of said second delay element and an output, and having a delay of one of said time intervals; and a fourth delay element having an input coupled to the output of said third delay element and an output, and having a delay of two of said time intervals; and said plurality of weighting function circuits comprise a first weighting function circuit coupled to the input of said first delay element having a weighting factor of substantially $+0.05$; a second weighting function circuit coupled to the output of said first delay element having a weighting factor of substantially $-0.3$; a third weighting function circuit coupled to the output of said second delay element having a weighting factor of substantially $+0.5$; a fourth weighting function circuit coupled to the output of said third delay element having a weighting factor of substantially $-0.3$; and a fifth weighting function circuit coupled to the output of said fourth delay element having a weighting factor of substantially $+0.05$.

21. The apparatus of claim 16 wherein:

said plurality of delay elements comprise first and second delay elements, each providing a delay of one of said time intervals; and said plurality of weighting function circuits comprise a first weighting function circuit coupled to an input of said first delay element having a weighting factor of 1; a second weighting function circuit coupled to an output of said second delay element having a weighting factor of 1; and a third weighting function circuit coupled to an output of said first delay element having a weighting factor of 2; and said second plurality of weighting function circuits comprise a fourth weighting function circuit coupled to the output of said second delay element having a weighting factor of substantially $-0.195$; and a fifth weighting function circuit coupled to the output of said first delay element having a weighting factor of substantially $0.369$.

22. The apparatus of claim 16 wherein:

said plurality of delay elements comprise first and second delay elements, each providing a delay of one of said time intervals; and said plurality of weighting function circuits comprise a first weighting function circuit coupled to the input of said first delay element and having a weighting factor of substantially $-1$; a second weighting function circuit coupled to an output of said secod delay element and having a weighting factor of substantially $-1$; and a third weighting function circuit coupled to an output of said first delay element and having a weighting factor of substantially 2; and said second plurality of weighting function circuits comprise: a fourth weighting function circuit coupled to the output of said second delay element and having a weighting factor of substantially $-0.195$; and a fifth weighting function circuit coupled to the output of said first delay element and having a weighting factor of substantially $-0.369$.

23. Video signal processing apparatus in a television receiver including a composite video signal decoder comprising:

a first filter including means for combining samples separated by a time interval of one horizontal line and having a frequency response null at DC;

a second filter including means for combining samples separated by a time interval of one frame and having a frequency response null at DC; and a high pass filter for passing that portion of the composite video signal normally occupied by a chrominance component; wherein:

said first, second and high pass filters are coupled in serial connection.

24. Video signal processing apparatus in a television receiver including a composite video signal decoder comprising:
a first filter including means for combining signals separated by a time interval of 262 horizontal lines and having a frequency response peak at DC;
a second filter including means for combining signals separated by a time interval of 263 horizontal lines and having a frequency response null at DC; and
a high pass filter for passing that portion of the composite video signal normally occupied by a chrominance component; wherein:
said first, second, and high pass filters are coupled in a serial connection.

25. The apparatus of claim 24, wherein said serial connection further includes:
a third filter including means for combining signals separated by a time interval of one horizontal line and having a frequency response null at DC.

26. Video signal processing apparatus including a filter having an input and an output comprising:
a first delay element having an input coupled to the input of said filter and an output, and providing a signal delayed by two time intervals of one of a horizontal line, a field, and a frame period;
a second delay element having an input coupled to the output of said first delay element and an output, and having a delay of one of said time intervals;
a third delay element having an input coupled to the output of said second delay element and an output, and having a delay of one of said time intervals;
a fourth delay element having an input coupled to the output of said third delay element and an output and having a delay of two of said time intervals;
a first weighting function circuit coupled to the input of said first delay element having a weighting factor magnitude of substantially 0.05;
a second weighting function circuit coupled to the output of said first delay element having a weighting factor magnitude of substantially 0.3;
a third weighting function circuit coupled to the output of said second delay element having a weighting factor magnitude of substantially 0.5;
a fourth weighting function circuit coupled to the output of said third delay element having a weighting factor magnitude of substantially 0.3;
a fifth weighting function circuit coupled to the output of said fourth delay element having a weighting factor magnitude of substantially 0.05; wherein
said first and fifth weighting function circuits have weighting factors of the opposite sign as that of said third weighting function circuit, and said second and fourth weighting function circuits have weighting factors of the same sign as that of said third weighting function circuit; and
a summing means having respective inputs coupled to first, second, third, fourth and fifth weighting function circuits; and an output coupled to the output of said filter.

27. The apparatus of claim 26, wherein said first and fifth weighting function circuits have weighting factors of the same sign as that of said third weighting function circuit, and said second and fourth weighting function circuits have weighting factors of the opposite sign as that of said third weighting function circuit.

28. Video signal processing apparatus including a filter having an input and an output comprising:
a first delay element having an input and an output and providing a signal delayed by a time interval of one of a horizontal line, a field, and a frame period;
a second delay element having an input coupled to the output of said first delay element and having a delay of one of said time intervals;
a first weighting function circuit coupled to the input of said first delay element having a weighting factor magnitude of substantially 1;
a second weighting function circuit coupled to the output of said second delay element having a weighting factor magnitude of substantially 1;
a third weighting function circuit coupled to the output of said first delay element having a weighting factor magnitude of substantially 2;
a first summing means having respective inputs coupled to said first, second, and third weighting function circuits, and an output coupled to said output of said filter;
a fourth weighting function circuit coupled to the output of said second delay element having a weighting factor magnitude of substantially 0.195;
a fifth weighting function circuit coupled to the output of said first delay element having a weighting factor magnitude of substantially 0.369; wherein:
said first, third, and fifth weighting function circuits have weighting factors of the same sign as that of said second weighting function circuit, and said fourth weighting function circuit has a weighting factor of the opposite sign as that of said second weighting function circuit; and
a second summing means having a first input coupled to said input of said filter, second and third inputs coupled to said fourth and fifth weighting function circuits respectively, and an output coupled to said input of said first delay element.

29. The apparatus of claim 28, wherein said first, third, fourth, and fifth weighting function circuits have weighting factors of the opposite sign as that of said second weighting function circuit.

* * * * *